(12) United States Patent
Barnard et al.

(10) Patent No.: US 11,100,386 B2
(45) Date of Patent: Aug. 24, 2021

(54) BUFFER ADDRESSING FOR A CONVOLUTIONAL NEURAL NETWORK

(71) Applicant: Imagination Technologies Limited, Kings Langley (GB)

(72) Inventors: Daniel Barnard, Berkamsted (GB); Clifford Gibson, St. Albans (GB); Colin McQuillan, Watford (GB)

(73) Assignee: Imagination Technologies Limited, Kings Langley (GB)

(*) Notice: Subject to any disclaimer, the term of this patent is extended or adjusted under 35 U.S.C. 154(b) by 993 days.

(21) Appl. No.: 15/726,633

(22) Filed: Oct. 6, 2017

(65) Prior Publication Data
US 2018/0101763 A1 Apr. 12, 2018

(30) Foreign Application Priority Data
Oct. 6, 2016 (GB) ..................... 1616953

(51) Int. Cl.
*G06N 3/04* (2006.01)
*G06F 12/02* (2006.01)
(Continued)

(52) U.S. Cl.
CPC ........... *G06N 3/04* (2013.01); *G06F 12/0207* (2013.01); *G06F 12/0607* (2013.01);
(Continued)

(58) Field of Classification Search
CPC ........ G06N 20/00; G06N 5/003; G06N 20/20; G06N 5/045; G06F 16/24578;
(Continued)

(56) References Cited

U.S. PATENT DOCUMENTS

2016/0232089 A1   8/2016  Wang
2016/0342888 A1   11/2016 Yang et al.
(Continued)

FOREIGN PATENT DOCUMENTS

| EP | 3306478 A1 * | 4/2018 | ............... G06N 3/04 |
| GB | 2554711 A * | 4/2018 | ......... G06F 12/0207 |

(Continued)

OTHER PUBLICATIONS

DU et al; "SHIDIANNAO: Shifting Vision Processing Closer To the Sensor"; Proceedings of the 42nd Annual International Symposium on Computer Architecture; Jan. 1, 2015; pp. 92-104 (Year: 2015).*

(Continued)

*Primary Examiner* — Paulinho E Smith
(74) *Attorney, Agent, or Firm* — Potomac Law Group, PLLC; Vincent M DeLuca

(57) ABSTRACT

Data for layers of a convolutional neural network (CNN) is provided by receiving input data values to be processed in a layer of the CNN and determining addresses in banked memory of a buffer in which the received data values are to be stored based upon format data indicating a format parameter of the input data in the layer and indicating a format parameter of a filter which is to be used to process the input data in the layer. The received input data values are then stored at the determined addresses in the buffer for retrieval for processing in the layer.

20 Claims, 14 Drawing Sheets

| Bank 0 | Bank 1 | Bank 2 | Bank 3 | Bank 4 | Bank 5 | Bank 6 | Bank 7 | |
|---|---|---|---|---|---|---|---|---|
| (0,0,0) | (0,0,1) | (0,0,2) | (0,0,3) | (0,0,4) | (1,0,0) | (1,0,1) | (1,0,2) | 0 |
| (1,0,3) | (1,0,4) | (2,0,0) | (2,0,1) | (2,0,2) | (2,0,3) | (2,0,4) | PAD | 1 |
| (1,1,1) | (1,1,2) | (0,1,0) | (0,1,1) | (0,1,2) | (0,1,3) | (0,1,4) | (1,1,0) | 2 |
| (2,1,4) | PAD | (1,1,3) | (1,1,4) | (2,1,0) | (2,1,1) | (2,1,2) | (2,1,3) | 3 |
| (0,2,4) | (1,2,0) | (1,2,1) | (1,2,2) | (0,2,0) | (0,2,1) | (0,2,2) | (0,2,3) | 4 |
| (2,2,2) | (2,2,3) | (2,2,4) | PAD | (1,2,3) | (1,2,4) | (2,2,0) | (2,2,1) | 5 |
| (0,3,2) | (0,3,3) | (0,3,4) | (1,3,0) | (1,3,1) | (1,3,2) | (0,3,0) | (0,3,1) | 6 |
| (2,3,0) | (2,3,1) | (2,3,2) | (2,3,3) | (2,3,4) | PAD | (1,3,3) | (1,3,4) | 7 |

(51) Int. Cl.
*G06N 3/063* (2006.01)
*G06F 12/06* (2006.01)

(52) U.S. Cl.
CPC ....... *G06F 12/0653* (2013.01); *G06N 3/0454* (2013.01); *G06N 3/063* (2013.01); *G06F 2212/1016* (2013.01); *G06F 2212/251* (2013.01)

(58) Field of Classification Search
CPC .. G06F 16/9027; G06F 16/2246; G06F 16/26; G06K 9/6282; G06K 9/00268; G06K 9/6256
See application file for complete search history.

(56) References Cited

U.S. PATENT DOCUMENTS

| | | | |
|---|---|---|---|
| 2018/0046900 A1* | 2/2018 | Dally | G06N 3/0427 |
| 2018/0101763 A1* | 4/2018 | Barnard | G06N 3/04 |
| 2019/0087718 A1* | 3/2019 | Martin | G06F 1/3275 |

FOREIGN PATENT DOCUMENTS

| | | | | |
|---|---|---|---|---|
| GB | 2584243 A | * | 11/2020 | ............ G06N 3/063 |
| WO | 2009/041350 A1 | | 4/2009 | |

OTHER PUBLICATIONS

Chen et al, "Eyeriss: A Spatial Architecture for Energy-Efficient Dataflow for Convolutional Neural Networks", 2016, IEEE, pp. 367-379 (Year: 2016).*

Du et al; "SHIDIANNAO: Shifting Vision Processing Closer to the Sensor"; Proceedings of the 42nd Annual International Symposium on Computer Architecture; Jan. 1, 2015; pp. 92-104.

Peemen et al; "Memory-Centric Accelerator Design for Convolutional Neural Networks"; 2013 IEEE 31st International Conference on Computer Design (ICCD); Oct. 1, 2013; pp. 13-19.

Qiu et al; "Going Deeper With Embedded FPGA Platform for Convolutional Neural Network"; Proceedings of the 2016 ACM/SIGDA International Symposium on Field-Programmable Gate Arrays; Jan. 1, 2016; pp. 26-35.

* cited by examiner

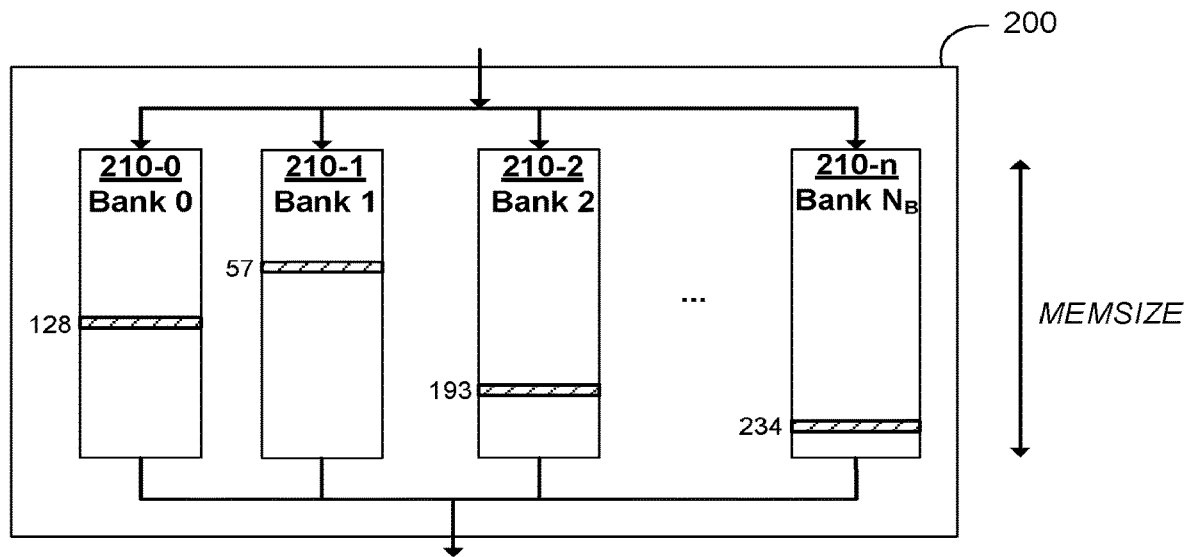
FIG. 4
| Bank 0 | Bank 1 | Bank 2 | Bank 3 | Bank 4 | Bank 5 | Bank 6 | Bank 7 | |
|---|---|---|---|---|---|---|---|---|
| (0,0,0) | (0,0,1) | (0,0,2) | (0,0,3) | (0,0,4) | (1,0,0) | (1,0,1) | (1,0,2) | 0 |
| (1,0,3) | (1,0,4) | (2,0,0) | (2,0,1) | (2,0,2) | (2,0,3) | (2,0,4) | PAD | 1 |
| (1,1,1) | (1,1,2) | (0,1,0) | (0,1,1) | (0,1,2) | (0,1,3) | (0,1,4) | (1,1,0) | 2 |
| (2,1,4) | PAD | (1,1,3) | (1,1,4) | (2,1,0) | (2,1,1) | (2,1,2) | (2,1,3) | 3 |
| (0,2,4) | (1,2,0) | (1,2,1) | (1,2,2) | (0,2,0) | (0,2,1) | (0,2,2) | (0,2,3) | 4 |
| (2,2,2) | (2,2,3) | (2,2,4) | PAD | (1,2,3) | (1,2,4) | (2,2,0) | (2,2,1) | 5 |
| (0,3,2) | (0,3,3) | (0,3,4) | (1,3,0) | (1,3,1) | (1,3,2) | (0,3,0) | (0,3,1) | 6 |
| (2,3,0) | (2,3,1) | (2,3,2) | (2,3,3) | (2,3,4) | PAD | (1,3,3) | (1,3,4) | 7 |
FIG. 5
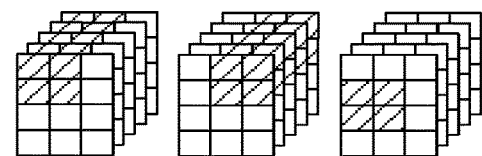
FIG. 6A    FIG. 6B    FIG. 6C
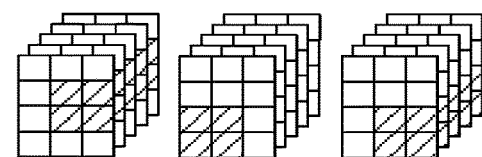
FIG. 6D    FIG. 6E    FIG. 6F

FIG. 9
FIG. 10A
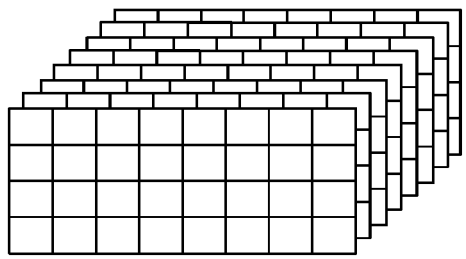
FIG. 10B
FIG. 11

| Bank 0 | Bank 1 | Bank 2 | Bank 3 | Bank 4 | Bank 5 | Bank 6 | Bank 7 | |
|---|---|---|---|---|---|---|---|---|
| (0,0,0) | (0,0,1) | (0,0,2) | (0,0,3) | (0,0,4) | (0,0,5) | (0,0,6) | (0,0,7) | 0 |
| (1,0,4) | (1,0,5) | (1,0,6) | (1,0,7) | (1,0,0) | (1,0,1) | (1,0,2) | (1,0,3) | 1 |
| (2,0,2) | (2,0,3) | (2,0,0) | (2,0,1) | (2,0,6) | (2,0,7) | (2,0,4) | (2,0,5) | 0 |
| (3,0,6) | (3,0,7) | (3,0,4) | (3,0,5) | (3,0,2) | (3,0,3) | (3,0,0) | (3,0,1) | 1 |
| (4,0,1) | (4,0,0) | (4,0,3) | (4,0,2) | (4,0,5) | (4,0,4) | (4,0,7) | (4,0,6) | 0 |
| (5,0,5) | (5,0,4) | (5,0,7) | (5,0,6) | (5,0,1) | (5,0,0) | (5,0,3) | (5,0,2) | 1 |
| (6,0,3) | (6,0,2) | (6,0,1) | (6,0,0) | (6,0,7) | (6,0,6) | (6,0,5) | (6,0,4) | 0 |
| (7,0,7) | (7,0,6) | (7,0,5) | (7,0,4) | (7,0,3) | (7,0,2) | (7,0,1) | (7,0,0) | 1 |
FIG. 12
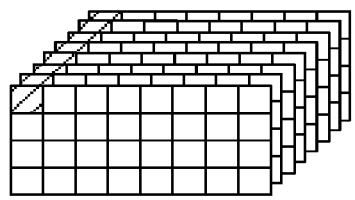
FIG. 13A
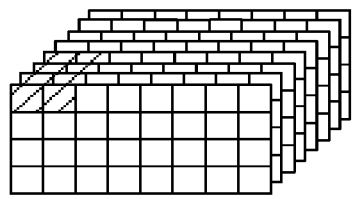
FIG. 13B

| (0,0,0) | (0,0,1) | (0,0,2) | (0,0,3) | (0,0,4) | (1,0,0) | (1,0,1) | (1,0,2) | 0 |
|---|---|---|---|---|---|---|---|---|
| (1,1,1) | (1,1,2) | (0,1,0) | (0,1,1) | (0,1,2) | (0,1,3) | (0,1,4) | (1,1,0) | 1 |
| (1,0,3) | (1,0,4) | (2,0,0) | (2,0,1) | (2,0,2) | (2,0,3) | (2,0,4) | PAD | 2 |
| (2,1,4) | PAD | (1,1,3) | (1,1,4) | (2,1,0) | (2,1,1) | (2,1,2) | (2,1,3) | 3 |
| (0,2,4) | (1,2,0) | (1,2,1) | (1,2,2) | (0,2,0) | (0,2,1) | (0,2,2) | (0,2,3) | 4 |
| (0,3,2) | (0,3,3) | (0,3,4) | (1,3,0) | (1,3,1) | (1,3,2) | (0,3,0) | (0,3,1) | 5 |
| (2,2,2) | (2,2,3) | (2,2,4) | PAD | (1,2,3) | (1,2,4) | (2,2,0) | (2,2,1) | 6 |
| (2,3,0) | (2,3,1) | (2,3,2) | (2,3,3) | (2,3,4) | PAD | (1,3,3) | (1,3,4) | 7 |
FIG. 15
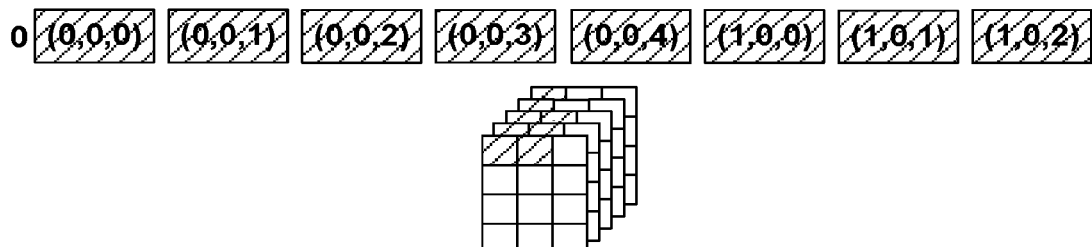
FIG. 16A
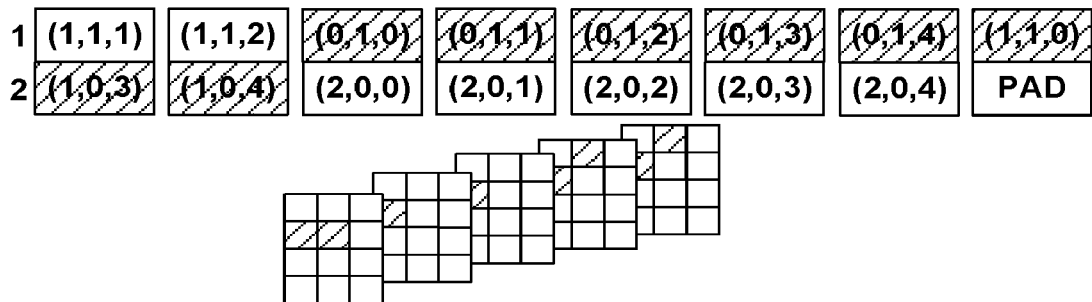
FIG. 16B
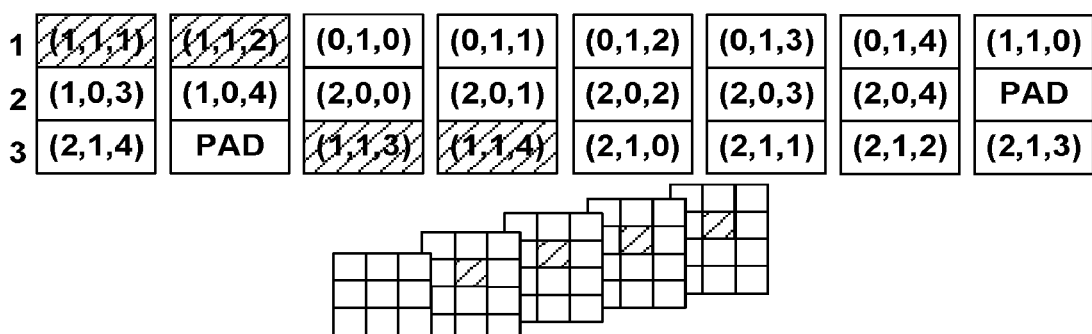
FIG. 16C

| 0 | (0,0,0) | (0,0,1) | (0,0,2) | (0,0,3) | (0,0,4) | (1,0,0) | (1,0,1) | (1,0,2) |
| 1 | (1,1,1) | (1,1,2) | (0,1,0) | (0,1,1) | (0,1,2) | (0,1,3) | (0,1,4) | (1,1,0) |
| 2 | (1,0,3) | (1,0,4) | (2,0,0) | (2,0,1) | (2,0,2) | (2,0,3) | (2,0,4) | PAD |

| 1 | (1,1,1) | (1,1,2) | (0,1,0) | (0,1,1) | (0,1,2) | (0,1,3) | (0,1,4) | (1,1,0) |
| 2 | (1,0,3) | (1,0,4) | (2,0,0) | (2,0,1) | (2,0,2) | (2,0,3) | (2,0,4) | PAD |
| 3 | (2,1,4) | PAD | (1,1,3) | (1,1,4) | (2,1,0) | (2,1,1) | (2,1,2) | (2,1,3) |

| 3 | (2,1,4) | PAD | (1,1,3) | (1,1,4) | (2,1,0) | (2,1,1) | (2,1,2) | (2,1,3) |

| 4 | (0,2,4) | (1,2,0) | (1,2,1) | (1,2,2) | (0,2,0) | (0,2,1) | (0,2,2) | (0,2,3) |

7 (2,3,0) (2,3,1) (2,3,2) (2,3,3) (2,3,4) PAD (1,3,3) (1,3,4)
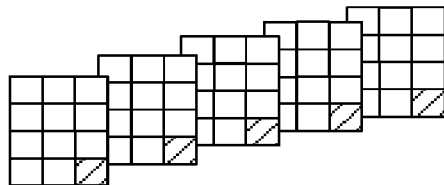
FIG. 16L
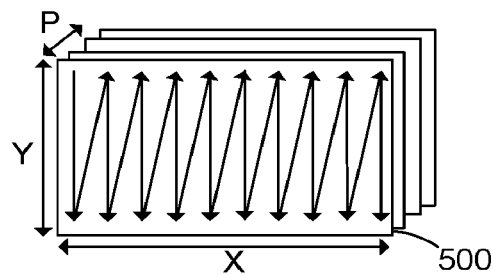
FIG. 17
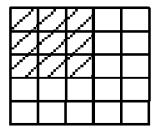      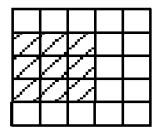      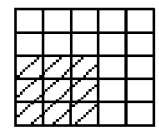
FIG. 18A            FIG. 18B            FIG. 18C
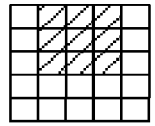      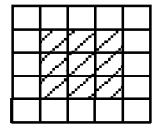      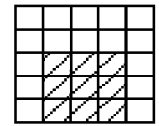
FIG. 18D            FIG. 18E            FIG. 18F
| (0,0,0) | (1,0,0) | (2,0,0) | (3,0,0) | 0 |
| (4,0,0) | PAD | PAD | PAD | 1 |
| (1,1,0) | (2,1,0) | (3,1,0) | (0,1,0) | 2 |
| PAD | PAD | PAD | (4,1,0) | 3 |
| (2,2,0) | (3,2,0) | (0,2,0) | (1,2,0) | 4 |
| PAD | PAD | (4,2,0) | PAD | 5 |
| (3,3,0) | (0,3,0) | (1,3,0) | (2,3,0) | 6 |
| PAD | (4,3,0) | PAD | PAD | 7 |
| (0,4,0) | (1,4,0) | (2,4,0) | (3,4,0) | 8 |
| (4,4,0) | PAD | PAD | PAD | 9 |
FIG. 19

BUFFER ADDRESSING FOR A CONVOLUTIONAL NEURAL NETWORK

BACKGROUND

A Convolutional Neural Network (CNN) is a type of artificial neural network that can be used for machine learning applications. In particular, a CNN can be used in signal processing applications, including image processing and computer vision applications.

In order to implement a CNN, it may be possible to produce a hardware accelerator. The hardware accelerator may be a specific hardware implementation configured to implement a specific CNN or may be a generalised hardware implementation configured to implement different CNNs (or any CNNs). In some hardware accelerators for implementing a CNN, the hardware may be required to process a significant amount of input data at a high rate of throughput. Therefore, it is necessary for the hardware to buffer input data in a manner that ensures that a consistent rate of data input into the calculation portion of the hardware is maintained. It is desirable for each layer of a CNN to be processed by the hardware in a relatively similar amount of time. This is particularly challenging for hardware implementing a CNN since, in typical CNN applications, the input data has different dimensionality in each layer. Addressing schemes which are used to determine memory addresses used to store input data in a buffer for retrieval when the input data is processed by the CNN may be configured to efficiently store input data for some layers but may not be appropriate for the data format of other layers.

There is therefore a need for an improved approach to improving the performance and data throughput of hardware configured to implement a CNN.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Hardware logic, such as a hardware accelerator, may be configured to be able to implement one or more convolutional neural networks (CNNs). In order to maximise input data throughput into the computational portions of hardware for implementing the CNN, it is desirable to buffer input data read from a memory before it is processed. In order to improve data throughout, data may be stored evenly across the banks of memory based on the manner in which it is to be retrieved. Described herein are addressing schemes that allocate input data to an input data buffer in a manner that evenly spreads the input data across multiple data banks based upon format parameters relating to the format of input data and filters used in processing the input data. As a result, data is retrieved from the banked memory at a high throughput. More specifically, input buffer performance can be critical when a number of filters used for each pass is small—for example, where a large filter size needs to be processed one at a time (due to coefficient buffer constraints). In this way, the transfer of data into the computational portions might, for some layers, take longer than the processing performed in the convolution engines. The loading of input data into the convolution engines might therefore be a limiting factor on performance of the hardware for implementing the CNN.

There is provided a method for receiving input data for a layer of a convolutional neural network "CNN" for processing, the method comprising: receiving input data as comprising input data values to be processed in a layer of the CNN; determining addresses in banked memory of a buffer in which the received data values are to be stored based upon format data indicating a format parameter of the input data in the layer and indicating a format parameter of a filter which is to be used to process the input data in the layer; and storing the received input data values at the determined addresses in the buffer for retrieval for processing in the layer.

There is provided hardware logic for implementing a convolutional neural network configured to receive input data for a layer of a convolutional neural network "CNN", the convolutional neural network configured to: receive input data comprising input data values to be processed in a layer of the CNN; determine addresses in banked memory of a buffer in which the received data values are to be stored based upon format data indicating a format parameter of the input data in the layer and indicating a format parameter of a filter which is to be used to process the input data in the layer; and store the received input data values at the determined addresses in the buffer for retrieval for processing in the layer.

The convolutional neural network may be embodied in hardware on an integrated circuit. There may be provided a method of manufacturing, at an integrated circuit manufacturing system, hardware for implementing a convolutional neural network. There may be provided an integrated circuit definition dataset that, when processed in an integrated circuit manufacturing system, configures the system to manufacture hardware for implementing a convolutional neural network. There may be provided a non-transitory computer readable storage medium having stored thereon a computer readable description of an integrated circuit that, when processed, causes a layout processing system to generate a circuit layout description used in an integrated circuit manufacturing system to manufacture hardware for implementing a convolutional neural network.

There may be provided an integrated circuit manufacturing system comprising: a non-transitory computer readable storage medium having stored thereon a computer readable integrated circuit description that describes the hardware for implementing a convolutional neural network; a layout processing system configured to process the integrated circuit description so as to generate a circuit layout description of an integrated circuit embodying the hardware for implementing a convolutional neural network; and an integrated circuit generation system configured to manufacture the hardware for implementing a convolutional neural network according to the circuit layout description.

There may be provided computer program code for performing a method as claimed in any preceding claim. There may be provided non-transitory computer readable storage medium having stored thereon computer readable instructions that, when executed at a computer system, cause the computer system to perform the method as claimed in any preceding claim.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which:

FIG. 4 shows an example input data buffer comprising a plurality of memory banks;

FIG. 5 shows the addressing of input data values in an input data buffer according to a first implementation;

FIG. 6A to FIG. 6F show a plurality of stages of a filter traversing input data according to the first implementation;

FIG. 9 shows the addressing of input data values in an input data buffer according to the first example of the second implementation;

FIG. 10A and FIG. 10B show different approaches for reading data from the input data buffer according to the first example of the second implementation;

FIG. 11 shows an example format of data according to a second example of the second implementation;

FIG. 12 shows the addressing of input data values in an input data buffer according to the second example of the second implementation;

FIG. 13A to FIG. 13D show different approaches for reading data from the input data buffer according to the second example of the second implementation;

FIG. 15 shows the addressing of input data values in an input data buffer according to the third implementation;

FIG. 17 shows the reading of data from the input data space according to a fourth implementation;

FIG. 18A to FIG. 18F show a plurality of stages of a filter traversing input data according to a fourth implementation;

FIG. 19 shows the addressing of input data values in an input data buffer according to the fourth implementation;

Figure 1:
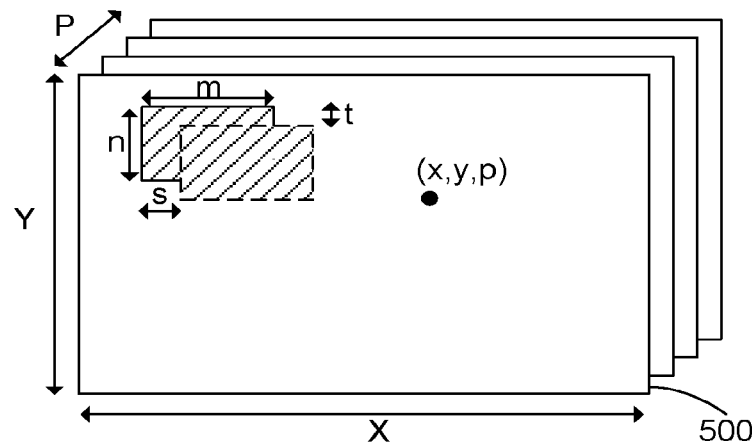
FIG. 1 shows an example format of input data utilised in a layer of a convolutional neural network.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art.

Embodiments will now be described by way of example only.

A Convolutional Neural Network (CNN) is a form of artificial neural network comprising a plurality of interconnected layers having weights associated therewith. The CNN is configured to perform signal processing tasks, including computer vision tasks. The functionality of the CNN is represented by the weights which are applied to input data for each layer.

A CNN is configured to process a set of input data for each layer by performing a convolution of the input data and weights (filters) associated with that layer. For a first layer, the 'input data' can be considered to an initial first input to the CNN, which, for a first layer, may represent RGB values of an image where each plane represents one of Red, Green, and Blue values. Since CNNs typically utilise a power of two number of input planes, a fourth plane comprising zero values may also be present in an RGB layer. In the first layer, input data is processed and a first set of intermediate data is generated that is passed to the second layer. The generated set of intermediate data may form the input data for the subsequent (second) layer.

The first set of intermediate data can be considered to form the input data for the second layer which processes the first intermediate data to produce output data in the form of second intermediate data. Where the CNN contains a third layer, the third layer receives the second intermediate data as input data and processes that data to produce third intermediate data as output data. This is repeated until the final layer produces output data that can be considered to be the output of the CNN.

Figure 2:
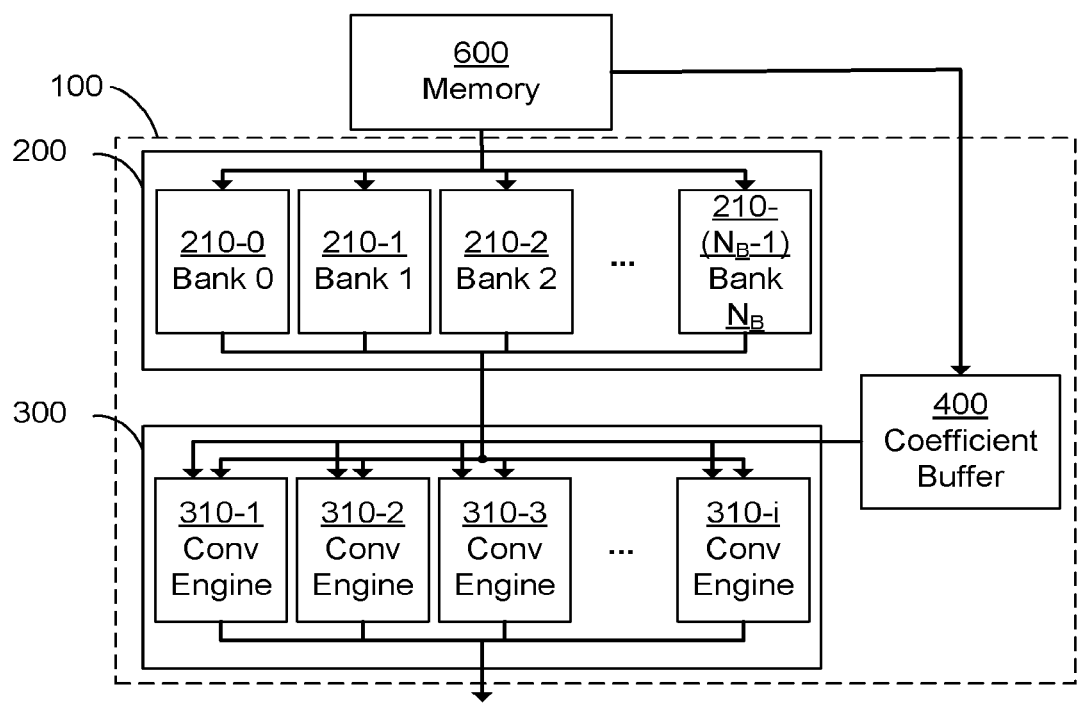
FIG. 2 shows example hardware accelerator for implementing a CNN.

An example format of input data utilised in a particular layer of a CNN is illustrated in FIG. 1. As can be seen in FIG. 1, the input data for a layer comprises a total of P planes 500 of input data, the input data having the same number of planes for a particular layer may have a number of planes in each layer. A plane of data has a width X and a height Y. The CNN is defined using a plurality of layers each of which has associated therewith F filters $w_1 \ldots w_F$, where F is greater than 1. The filters $w_1 \ldots w_F$ each have a dimension m×n×P and are convolved with the input data by traversing the filter(s) across a number of steps in the X and Y direction according to a respective horizontal and vertical stride length s and t in a rasterised manner, as illustrated in FIG. 1. A specific value in the input data may be identified using three co-ordinates into the three-dimensional input data space, namely by coordinates (x,y,p), where x represents the horizontal position within the space, y represents the vertical position within the space, and P represents the plane index Example hardware logic 100 for implementing a CNN is illustrated in FIG. 2. The example hardware logic 100 may be regarded as a hardware accelerator for implementing a CNN. The hardware logic 100 may be a standalone hardware module that is configured to receive input data to be processed by the CNN implemented by the hardware logic, filter data that defines the CNN to be implemented by the hardware logic, and a control stream that defines data that data required to implement the CNN, such as the format data for at least one of the input data and the filter logic, as well as other features such as the number of layers of CNN the hardware logic needs to implement and the data format used. For example, the control stream may include control information to control the operation of the hardware as well as format information indicating the format in which the input data and filter data should be processed. In some arrangements, the hardware logic 100 may be a standalone module that is configured to receive this data from an external source. In other implementations, the hardware logic 100 may be implemented within alongside a processor, such as a CPU and/or a GPU. The hardware logic 100 may be implemented in a system-on-chip (SoC).

The hardware logic 100 comprises a coefficient buffer 400 and an input data buffer 200 that is configured to receive data from memory 600 which may be internal or external to the hardware logic 100. The coefficient buffer 400 is configured to store weight data (also referred to as coefficient data) received from memory 600. The weight data may be regarded as data which defines the filter values that are convolved with the input data values. The input data buffer 200 is configured to store input data received from memory 600. The weight and input data stored in the memory is respectively passed to the coefficient buffer 400 and input data buffer 200 for buffering prior to being passed to a convolution module 300 that comprises i convolution engines 310-1 to 310-i, where i may correspond with the largest width in a particular CNN or may be fixed.

The i convolution engines 310-1 to 310-i are each configured to perform a convolution of the filter data received from the coefficient buffer 400 and the input data received from the input data buffer 200. Each cycle, the convolution engines 310-1 to 310-i each perform a convolution of the same set of weights of the plurality of weights with windows corresponding to different output positions.

Figure 3:
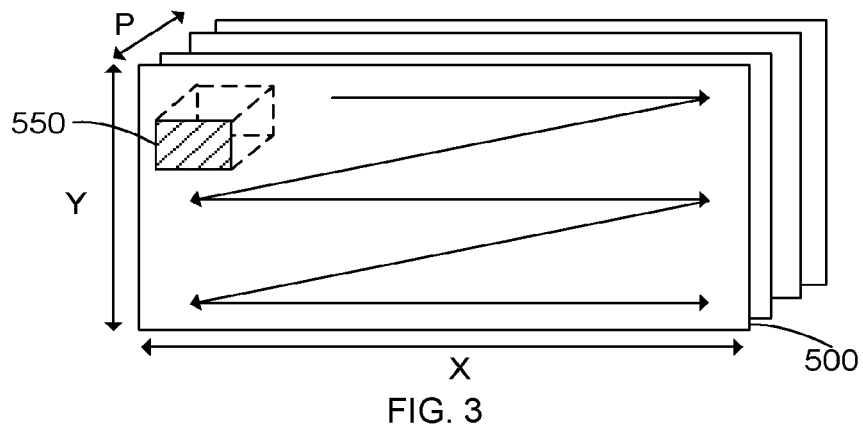
FIG. 3 shows an example of the traversal of a filter across input data for a layer of a convolutional neural network.

For example, a window of the input data may be processed in a particular stage of processing by the convolution engines. In this stage, the window may be defined at a particular location based upon the size of the weights in the layer being processed. For this example, it is assumed that m=3 and n=3. Accordingly, a window of data that is 3×3 in size is retrieved from the input data buffer 200 and passed to each convolution engine. An example window 550 is illustrated in FIG. 3. Each convolution engine 310-1 to 310-i is provided with the same filter of the plurality of filters that are to be applied for a particular layer and a convolution operation is then performed. Then, for each convolution engine that has the provided filter, a window of input data is passed to a convolution engine. Each filter at each convolution engines is applied at a particular window position. The filters that are collectively applied across the convolution engines can be regarded as set of windows each positioned at a different location in the input data space. In a subsequent read cycle, if not all of the input data required to complete processing is passed to the convolution engines for the particular set of windows (e.g. not all P planes of data for that set of windows have been passed to the convolution engines) then further input data for that set of windows is passed to the convolution engines. Once all of the data for a particular set of windows has been processed by the convolution engines, the set of windows applied across the convolution engines 310-1 to 310-I is shifted to a new set of positions along the data space and the process is repeated. This transition of a set of windows across the input data may be performed in a rasterised manner in which the set of windows effectively traverses from the origin position at the uppermost left corner of the input plane in a horizontal direction (i.e. coordinate y is fixed and coordinate x increases). Once a row of input data has been traversed, the data then returns to the beginning of the following line (or traverses multiple lines of input data depending on the stride of the filter t). At each (x,y) location all data values from coordinate p=0 to p=P may be read from the input data buffer before incrementing x.

Accordingly, for each window applied to the input data, input data is read from the input data buffer 200 and passed to the convolution engines 300. However, an input data buffer may require multiple clock cycles to retrieve the data from the input data buffer 200. For example, the input data may be large (e.g. x, y, or p are large). In this scenario, a relatively large amount of data may need to be passed to the convolution engines 300 for a single layer of the CNN. A limiting factor when reading data from the input data buffer 200 is the amount of data that can physically be read from the input data buffer in a particular read cycle (e.g. a single clock cycle). It is therefore desirable to implement an input data buffer that is able to maximise data throughput from the input data buffer to the convolution engines.

In some arrangements, the input data may be stored in memory 600 in a quasi-planar format, in which a plurality of quasi-planar planes can be stored in an interleaved format. Data may be stored in memory 600 in planes of a fixed size. The fixed size may correspond with a burst size of memory 600. Specifically, data values at a specific location (x,y) are stored together in memory 600 for a fixed, predetermined number of planes. For example, data values at a location (x,y) may be stored in successive memory locations between plane indices 0 and P. The data may be stored in, and consecutively read from, memory 600. In other arrangements, the number of planes stored consecutively may be greater such that the quasi-planar planes are separated into a number of sub-planes each storing a fixed number of planes of data for a specific location (x,y). An example of this data format for co-ordinates (x,y,p) is illustrated in the table below where P=16 but only eight plane values are stored consecutively together:

| (0, 0, 0) | (1, 0, 0) | . . . | (X-1, 0, 0) |
|---|---|---|---|
| to | to | | to |
| (0, 0, 7) | (1, 0, 7) | | (X-1, 0, 7) |
| (0, 1, 0) | (1, 1, 0) | . . . | (X-1, 0, 0) |
| to | to | | to |
| (0, 1, 7) | (1, 1, 7) | | (X-1, 1, 7) |
| . . . | . . . | . . . | . . . |
| (0, Y-1, 0) | (1, Y-1, 0) | . . . | (X-1, Y-1, 0) |
| to | to | | to |
| (0, Y-1, 7) | (1, Y-1, 7) | | (X-1, Y-1, 7) |

A subsequent plane for 8≤p≤15 is illustrated below:

| (0, 0, 8) | (1, 0, 8) | . . . | (X-1, 0, 8) |
|---|---|---|---|
| to | to | | to |
| (0, 0, 15) | (1, 0, 15) | | (X-1, 0, 15) |
| (0, 1, 8) | (1, 1, 8) | . . . | (X-1, 0, 8) |
| to | to | | to |
| (0, 1, 15) | (1, 1, 15) | | (X-1, 1, 15) |
| . . . | . . . | . . . | . . . |
| (0, Y-1, 8) | (1, Y-1, 8) | . . . | (X-1, Y-1, 8) |
| to | to | | to |
| (0, Y-1, 15) | (1, Y-1, 15) | | (X-1, Y-1, 15) |

As mentioned above, the size of each quasi-planar plane is typically defined according to a burst size of the memory 600. Accordingly, where X and Y are sufficiently small that the input data for a particular sub-range of planes (e.g. 8≤p≤15) conforms to a burst size of the memory 600, it is possible that all of the input data values for the sub-range of planes fits within a quasi-planar plane. If the total amount of data to be stored for a quasi-planar plane is less than a burst size, then the memory is padded for the remainder of the memory equivalent to a burst and the next quasi-planar plane is stored in the next portion of memory.

However, in other arrangements, X and Y may be sized such that not all of the data values for a particular plane fit within a quasi-planar plane. In this scenario, the input data for a particular sub-range of planes is separated into multiple quasi-planar planes.

According to the data format, the memory 600 may store in consecutive positions within memory all of the values at coordinate (x,y) across all planes (or a predetermined sub-range of planes). In this way, the values may be consecutively retrieved from memory 600 in the following sequence: (0,0,0), (0,0,1), . . . , (0,0,P-1), where (0,0,0) represents the uppermost left value of the plane. In some arrangements, each plane stored in memory 600 is of a fixed size. In this way, the amount of data stored in a plane is fixed, but the proportion of the sequence stored in a single quasi-planar plane will depend upon the total number of planes, P, in addition to the size of the planes (defined by X and Y). Each location is stored in and thus retrieved from memory 600 in succession in a rasterised fashion. In this way, for a sub-range of planes a first row of values from (0,0) to (X-1,0) are stored consecutively. Then, a second row of values from (0,1) to (X-1,1) is stored and this process is repeated until a final row (0, Y-1) to (X-1, Y-1) is stored.

The data stored in memory 600 is therefore stored in a manner that provides locality to the stored data. In a CNN, a filter is applied to the input data within a window and then the filter is applied to a subsequent window such that the filter is applied in a rasterised format across a plane (as illustrated in FIG. 3), subject to a defined filter stride. By storing the data in the memory 600 in this manner, it is not necessary to load from memory a large number of successive values in order to obtain and keep in the input data buffer, input data values needed for the next filter to be applied. Similarly, a filter is applied at a location across all planes. In this way, data is retrievable in a manner that relates to the order in which it is processed within a CNN. It is therefore efficient to retrieve data from the memory in bursts whilst minimising the number of bursts required to retrieve useful data from memory 600.

The input data that is retrieved from memory 600 is stored in the input data buffer 200 in a number of different banks 210-0 to 210-($N_B$-1). The number of banks in the input data buffer 200 is defined by $N_B$ and is typically a power of two. Since the data read from memory 600 is read in a consecutive manner and has a geometric pattern with some locality that relates to the order in which the data will be used by the convolution engines, it is desirable to determine an addressing scheme for storing to and retrieving data from the banks in a manner that reduces or eliminates bank clashes and thus maximises throughput. In addition, since the dimensionality of the input data and filters will likely differ between the layers, it is desirable to determine an addressing scheme that is adaptable between the data formats of different layers.

In some arrangements, it is only possible to read from a single address in each bank of the input data buffer 200 in each clock cycle. In this way, the inventors have recognised the need to establish an addressing scheme that ensures that amount of data read from the input data buffer is maximised and consistent for each read cycle. Put another way, the inventors have recognised that multiple input data values needing to be read from the same bank of memory during a read cycle can cause a bank clash or collision within the memory. Such a clash means that one of the two or more data elements which need to be accessed during the same read cycle will need to be read during a subsequent read cycle, which decreases the data throughput (and consistency of data throughput) from the input data buffer 200 to the convolution engines 300 and thus decreases the processing speed of the hardware implementation of the CNN, as well as decreasing the power consumption.

Specifically, in some arrangements it may be necessary to place the input data into the banks of memory of the input data buffer in a manner that ensures that the data output from the banks can be maximised. This means that, each read cycle of the input data buffer, an input data value from each bank the buffer is accessed. To do this, it is necessary to establish an addressing scheme for the banks of the input data buffer that should ensure that the data is appropriately allocated to the various banks of the memory.

The inventors have recognised that, whilst it may be possible to determine a static addressing scheme that is able to maximise the data throughput from the data input buffer 200 to the convolution engines 300 for a specific set of parameters for a given layer of the CNN, i.e. for a given dimensionality of input data and weight (filter) data, that some addressing schemes may be less optimal for other layers that have different dimensions. For example, in a CNN the dimensionality of the input data may vary between layers such that an addressing scheme that provides high throughput for a first layer may not provide useful throughput for subsequent layers. In the example of image processing, the data format for a first layer may relate to the resolution of an image in the RGB space.

Addressing schemes according to one or more examples of the present disclosure are set out below. The addressing schemes set out herein are dynamic in that the precise addressing scheme used for a particular layer may be different to the addressing scheme used in other layers. Put another way, the addressing scheme may adapt in each layer to the format of the input data and the format of the filter data. The addressing scheme may be dependent on the dimensions of the input data as well as the dimensions of the filter weights for a particular layer and the manner in which the convolution engines are to process the input data. Since the dimensionality of the filter to be applied varies, the addressing scheme may be configured to correspond with the dimensionality of the input data for that layer. Similarly, the specific input data that is needed by the convolution module may depend upon the size of the filter that is to be applied. In this way, the addressing scheme to be used depends on the size of the filter to be applied. The addressing schemes described herein provide approaches for storing input data in the banks of memory of the input data buffer regardless of the data and filter dimensionality.

Figure 21:
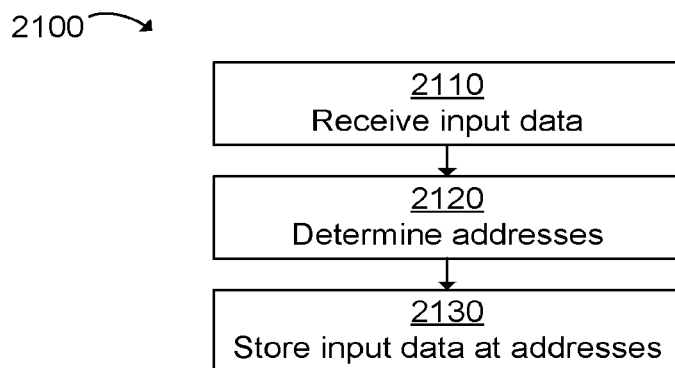
FIG. 21 shows an example approach to implementing an addressing scheme.

FIG. 21 illustrates an approach to implementing the addressing schemes according to the present disclosure that can be performed for each layer of the CNN to be implemented. For example, a method 2100 is illustrated in which input data is received at step 2110. The input data comprises input data values that are to be processed in a layer of the CNN. The method 2100 further comprises determining addresses at step 2120 in banked memory of a buffer in which the received data values are to be stored based upon format data that indicates a format parameter of the input data in the layer and indicates a format parameter of a filter which is to be used to process the input data in the layer. At step 2130, the input data values are stored at the determined address in the buffer for retrieval for processing in the layer. The following provides examples of addressing schemes and their implementation.

As illustrated in FIG. 4, the input data buffer 200 is configured into $N_B$ banks (210-0 to 210-($N_B$-1)) of memory, where $N_B$ is typically a power of two number of banks. Each bank has MEMSIZE number of addresses, such that the total size of the input data buffer 200 is given by $N_B$*MEMSIZE.

For the purposes of describing the examples set out below, it is assumed that each memory word is used to store a single input data value. In some arrangements, a dynamic number of planes and a dynamic number of data values may be packed into a single memory word. To implement this, the values P and X may be replaced in the following equations with the respective values $$\frac{(P + PK_p * PUW - 1)}{(PK_p * PUW)} \text{ and } \frac{(X + PK_x - 1)}{PK_x}$$

in the following equations, where $PK_p$ is the number of plane units packed into a single memory word, where PUW is the number of planes of the plurality of planes P packed into a single plane unit, and where PKx is the number of x locations packed into a single memory word. In the event that more than one plane or data value is stored in a single memory word, the values P, M, X, x, and p are replaced with the corresponding values below in the address calculations, with replacement values corresponding to original values but with a "'" character:

$$P' = \frac{(P + (PUW * PK_p - 1))}{PUW * PK_p}$$

$$M' = \frac{(M + (2 * PK_x - 2))}{PK_x}$$

$$X' = \frac{(X + PK_x - 1)}{PK_x}$$

$$x' = \frac{x}{PK_x}$$

$$p' = \frac{p}{PUW * PK_p}$$

Generally, a memory location in the input data buffer 200 can be addressed using two values. The first value, BANKSEL, indicates in which bank of memory the data value is located where $0 \leq BANKSEL \leq N_B-1$. The second value, MEMADDR, indicates the memory location of a specific bank where $0 \leq MEMADDR \leq MEMSIZE-1$. FIG. 4 illustrates four example locations in the input data buffer 200 which are indicated by hashed lines. A first location is illustrated in Bank 0 and has a BANKSEL value of 0 and a MEMADDR value of 128. A second location is illustrated in Bank 1 and has a BANKSEL value of 1 and a MEMADDR value of 57. A third location is illustrated in Bank 2 and has a BANKSEL of 2 and a MEMADDR of 193. A fourth location is illustrated in Bank $N_B$-1 and has a BANKSEL value of $N_B$-1 and a MEMADDR value of 234.

Addressing Scheme—First Implementation

In a first example of an addressing scheme, the input data values are stored in external memory in an interleaved manner that may be referred to as an M*N*P read approach.

The addressing scheme determines for each value of the input data read from memory a position within the input data buffer such that there is a 1-1 correspondence between an (x,y,p) coordinate in the input data space and a BANKSEL and MEMADDR value in the input data buffer. Specifically, the addressing scheme is used to generate MEMADDR and BANKSEL values. Each input data value is then stored in the input data buffer at a location based on the values calculated for MEMADDR and BANKSEL.

Prior to calculating MEMADDR and BANKSEL values for input data values, a value WordsPerLine is identified for a particular layer to be processed. This value may be calculated based on received parameter values or may be explicitly provided. The WordsPerLine value provides an indication as to the number of memory words that are to be used, across all $N_B$ banks, to represent a line of input data values across all input planes, P. For example, P*X is the number of input data values across a row or line of the input data space. The value WordsPerLine indicates the number of words of each bank of memory that will be required to store a row of the input data. The calculation performs an effective "rounding" to the next complete number of words across all banks of memory. That is, where a line of input data is written in memory before reaching the last memory bank, the next memory address with the remaining banks of that line being padded.

$$WordsPerLine = \text{floor}\left(\left(\frac{P*X + N_B - 1}{N_B}\right)\right) * N_B$$

For example, where $N_B$=8 and (P*X)=5, then $$\left(\frac{P*X + N_B - 1}{N_B}\right) = 1.5.$$

This value is then rounded down to 1 and multiplied by $N_B$ to arrive at the value WordsPerLine=8. As such, to represent a line of input data values (across all P planes) 8 words of memory are required. In this way, one row of memory is used to represent the input data values. In another example, where $N_B$=8 and (P*X)=10, then $$\left(\frac{P*X + N_B - 1}{N_B}\right) = 2.125$$

which, when rounded down, results in WordsPerLine=16. Accordingly, more than 8 words of memory are required to store a line of input data values. Two complete rows of memory are therefore used to represent the values in a single line of the input data, even if the final row will be partially padded. Whilst this reduces the memory usage efficiency, this approach enables bank collisions to be avoided since respective input data rows are stored separately from each other.

Subsequently, values for MEMADDR and BANKSEL are determined for each input data value. Specifically, MEMADDR is determined by the following equations where x, y, p represent the coordinate of the input data value, P represents the total number of planes of input data, p represents the plane index, and m represents the filter width:

$$MEMADDR(x, y, p) = \text{floor}\left(\frac{\left(\frac{x*P + p + y*}{WordsPerLine}\right)}{N_B}\right) \% \ MEMSIZE$$

$$BANKSEL(x, y, p) = (x*P + p + y*m*P) \% \ N_B$$

An example of the application of the addressing scheme of the implementation is illustrated in FIGS. 5 to 7 where $N_B$=8, m=2, X=3, and P=5. FIG. 5 illustrates memory locations of an input data buffer in which input data values are stored. The memory locations are identifiable by a Bank number, from 0 to 7 and an address position (MEMADDR) in respective banks. For example, the top left memory location is identified by MEMADDR=0 and BANKSEL=0 and the bottom right value is identified by MEMADDR=7 and BANKSEL=7. In this example, each memory location stores a single input data value. Each input data value stored in a memory location is represented by three coordinates (x,y,p) which indicate the respective coordinates in the input data space from which the value was retrieved. The position of the input data value in the input data buffer is determined according to the addressing scheme equation set out above and, according to this example, the resultant values are arranged as illustrated in FIG. 5.

As can be seen from FIG. 5, four cells are highlighted using vertical lines. These cells represent a new line of the input data. As can also be seen from FIG. 5, there are memory locations used for padding (referenced using the term "PAD" in the figures) due to the WordsPerLine calculation.

The example of FIG. 6 illustrates data read from the input buffer and provided to the convolution engines over a number of read cycles. Specifically, FIG. 6 illustrates the data read from the input data buffer and provided to the convolution engines during the application of a 2×2 filter to the input data planes according to the example of FIG. 5. In each stage, the filter is applied across all P planes of four different (x,y) positions of the input data. The filter traverses the input data in a rasterised manner by traversing a row of the input data according to the horizontal stride s and then repeats the traversal with an incremented vertical position based on the vertical stride t. In a first stage, illustrated in FIG. 6(a), the filter is applied across all P planes in positions (0,0,p), (0,1, p), (1,0, p), and (1,1,p). In a second stage, illustrated in FIG. 6(b), the filter is applied across all P planes in positions (1,0,p), (2,0,p), (1,1, p), and (2,1,p). In FIG. 6(c), the filter is applied in a third stage to positions (0,1,p), (1,1, p), (0,2,p), and (1,2,p). In FIG. 6(d), the filter is applied in a fourth stage to positions (1,1,p), (2,1,p), (1,2,p), and (2,2,p). In FIG. 6(e), the filter is applied in a fifth stage to positions (0,2,p), (1,2,p), (0,3,p), and (1,3,p). In FIG. 6(f), the filter is applied in a sixth stage to positions (1,2,p), (2,2, p), (1,3, p), and (2,3, p). It will be appreciated that in other arrangements, the filter may traverse the input data in a different manner, as will be explained later.

FIG. 6 illustrates a number of stages of the retrieval of input data values from the input data buffer to be passed to the convolution engines. The input data retrieved from the input data buffer is based on the convolution engines requiring input data according to the traversal of the filter across the input data shown in FIG. 5. As will be appreciated, the memory 600 may be configured such that the stage may be split into a number of read cycles based on the read bandwidth of the memory. The read bandwidth can be considered to be limited by the number of banks, since only one word can be read from each bank during a single read cycle. It is therefore desirable for $N_B$ words (e.g. input data values) to be retrieved from the input data buffer each read cycle without a bank collision occurring. A bank collision occurs where two or more input data values needed during a single read cycle are located in the same bank of memory.

As illustrated in the following example, bank collisions are avoided for each read cycle by using the example addressing scheme.

Figure 7A:
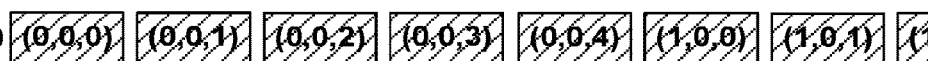
FIG. 7A to FIG. 7F show a plurality of cycles of reading data from the input data buffer according to the first implementation.
Figure 7A:
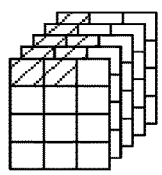
Figure 7B:
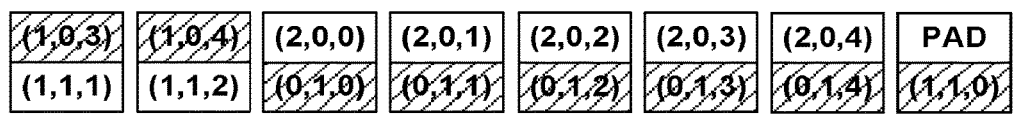
Figure 7B:
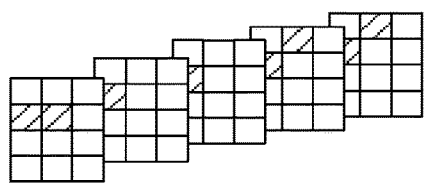
Figure 7C:
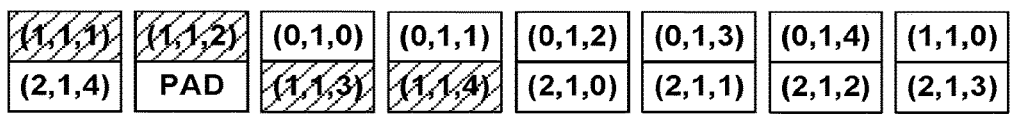
Figure 7C:
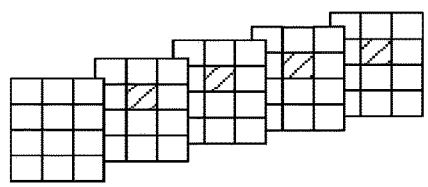

FIGS. 7(a) to 7(c) each illustrate successive read cycles used to read from the input data buffer the input data required to the first stage illustrated in FIG. 6(a). As illustrated in further detail below, three read cycles are required to read all of the input data values of the first stage in FIG. 6(a).

FIG. 7(a) illustrates the memory locations in the input data buffer that are read during the first read cycle. Specifically, the hashed lines indicate memory locations that are read in the read cycle. As can be seen from FIG. 7(a), eight input data values are read from the input data buffer, one data value from each bank of the input data buffer. All eight input data values read from the input data buffer are stored in different memory banks and thus can all be read during a single cycle without the occurrence of a bank collision.

FIG. 7(b) illustrates the memory locations in the input data buffer that are read during the second read cycle. As can be seen from FIG. 7(b), eight different input data values are read from the input data buffer, one from each of the eight memory banks. In FIG. 7(b) it can be seen that some of the data values are read from different MEMADDR positions. Specifically, values (1,0,3) and (1,0,4) are read from MEMADDR=1 and values (0,1,0), (0,1,1), (0,1,2), (0,1,3), (0,1,4), (1,1,0) are read from MEMADDR=2. However, since each value is read from a different memory bank, all eight values can be read during the same read cycle without a bank collision. FIG. 7(c) illustrates the third read cycle for the filter position of FIG. 6(a) in which the final four input data values are read.

Figure 7D:
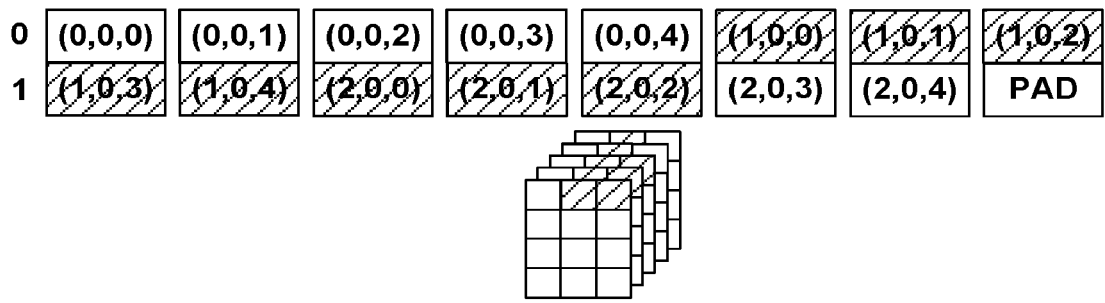
Figure 7E:
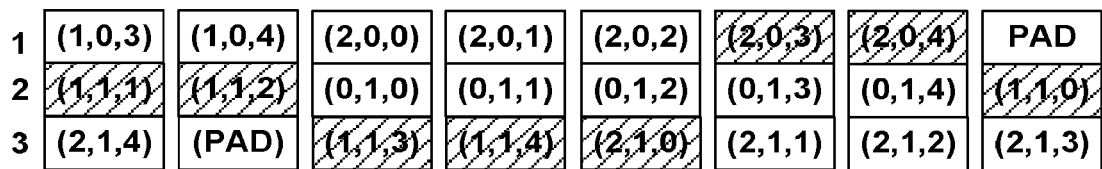
Figure 7F:
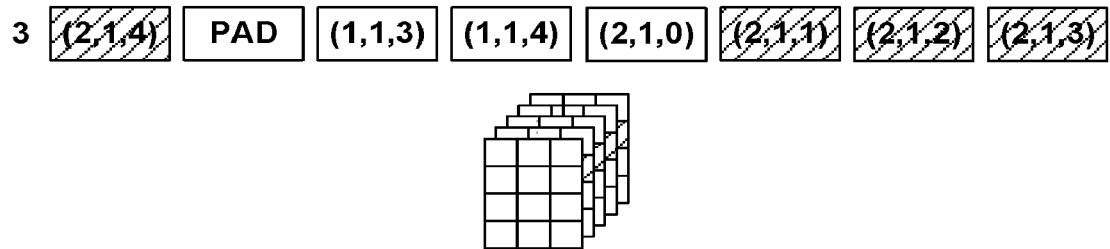

FIG. 6(b) illustrates a second filter position during the processing of input data by a filter and FIGS. 7(d) to 7(f) each illustrate a read cycle of the three read cycles used to read from the input data buffer the input data values needed by the convolution engines to perform the calculation. Specifically, FIG. 7(d) illustrates a first read cycle for the second filter position in which eight input data values are read from the input data buffer. As can be seen from FIG. 7(d), eight input data values are read without the occurrence of a bank collision.

Furthermore, it will be noted that some of the input data values that are read during the read cycle of FIG. 7(a) are also read during the read cycle of FIG. 7(d), namely (1,0,0), (1,0,1), and (1,0,2). This corresponds with the overlapping filter position in FIGS. 6(a) and 6(b). The addressing scheme used to store the input data values in the input data buffer ensures that the reading of these values in either the read cycle of FIG. 7(a) or 7(d) does not cause a bank collision with the other input data values that are to be read during the respective read cycles.

For example, in the arrangement of FIG. 7(d), the other five input data values that are to be read from the input data buffer are to be read from MEMADDR=1, BANKSEL=0 to 4. As can be seen in the second and third read cycles for the second filter position illustrated respectively in FIGS. 7(e) and 7(f), no bank collisions occur and the amount of data that is output from the input data buffer is $N_B$.

Due to the structure of the input data, it can be shown that it is possible to write $N_B$ interleaved planes at one horizontal position efficiently. For a fixed x and y, there is a 1-1 correspondence between p % $N_B$ and (y*M*P+x*P+p) % $N_B$ and thus the BANKSEL value is different for each p % $N_B$ and no bank collisions occur.

Addressing Scheme—Second Implementation

The arrangement of the first implementation is configured such that the input data is to be read from input data buffer in a p-> x-> y order. That is, the input data values from each of the planes at position (0,0) are first read and passed to the convolution engines to be processed. Then, the x coordinate is incremented and all of the input data values from each of the planes at (1,0) are read and passed to the convolution engines to be processed. Once the row (x, 0) is completed, coordinate y is incremented and the process is repeated for row (x, 1).

In some implementations, it may be desirable to read from external memory into the input data buffer only a single plane value from each (x,y) coordinate position. In other implementations, it may be desirable to read from external memory into the input data buffer a subset of the plane values from each (x,y) coordinate position. By retrieving data from external memory in this way, the data can be stored efficiently in the input data buffer so as to allow a sub-set of planes written into the input data buffer within a single line. This approach is efficient within the context of data being formatted within the external memory in subsets of planes. Accordingly, when the data is ordered in external memory in subsets of planes, it can be efficient to retrieve that data from external memory in that format, for example by utilising bursts of memory reads. However, storing data in the received order across rows of the input data buffer, might result in subsequent reads of the input data buffer being inefficient.

In the second implementation described herein, a modified addressing scheme is set out which is configured to enable the input data values to be stored in the input data buffer in subsets of the planes of the input data. The second addressing scheme is applied according to the following equations, where NPU=the largest power of two dividing P, up to a maximum of $N_B$, and $$NSB = \frac{N_B}{NPU}.$$

For any value 0≤x<NPU, Reverse(x) is defined as the result of reversing all $\log_2(NPU)$ binary digits of x.

$$RAMADDR(x, y, p) = \text{floor}\left(\left(\frac{x*P + p + y*WordsPerLine}{N_B}\right)\right) \% \text{ MEMSIZE}$$

$$BANKSEL(x, y, p) =$$
$$((y*m*P + x*P + p) \% N_B) \text{XOR Reverse}\left(\left(\frac{x}{NSB}\right) \% NPU\right)$$

Figure 8:
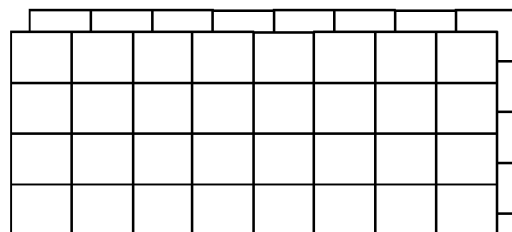
FIG. 8 shows an example format of data according to a first example of the second implementation.

A first example of the second implementation is set out in FIGS. 8, 9, and 10 in which P=2, W=8, and $N_B$=8. FIGS. 8, 9, and 10 differ from the Figures of the first implementation in that the shaded portions of memory indicate the input data values that are loaded into the input data buffer during a single write cycle (where in the first implementation they indicated the input data values read from the input data buffer during a single write cycle).

FIG. 8 illustrates the input data dimensionality of the first example of the second implementation. In this first example, the data is read from the external memory and written to the input data buffer a single plane at a time. FIG. 9 illustrates the input data values that are to be written to the first two lines of the input data buffer.

The implementation illustrated in FIGS. 8, 9 and 10 differs from the first implementation in that a further variable NPW is also provided to the hardware during the read of data from the external memory and the write of data into the input data buffer. NPW represents the number of planes that are to be read from external memory into the input data buffer at a time. In the following example, NPW is a power of 2 that is less than or equal to NPU, where NPU is the largest power of two dividing P, up to a maximum of $N_B$.

FIGS. 10(a) and 10(b) illustrate two different examples of writing data to the input data buffer. In FIG. 10(a), NPW=1 and thus the input data values are written to the input data buffer one plane at a time. The shaded memory locations in FIG. 10(a) illustrate the input data values that are written to the input data buffer during a first write cycle (along with a visual representation of the position of those data values in the input data space). As can be seen FIG. 10(a), the data is written to the input data buffer without a bank collision occurring. Similarly, FIG. 10(b) illustrates an arrangement where NPW=2. Again, the shaded memory locations in FIG. 10(b) illustrate the input data values that are written to memory during a first write cycle. As can be seen, in the case of FIG. 10(b) no banks collisions occur during the writing of data to the input data buffer. The second implementation allows the data to be read from memory, a single x,y location (and across all planes) at a time. For example, as can be seen from both FIGS. 10(a) and 10(b), by reading row 0 of the input data buffer, the input data values at both planes of x,y coordinates (0,0), (1,0), (2,0), and (3,0) can be read from a single line of the input data buffer.

Another example of the second arrangement is illustrated in FIGS. 11, 12, and 13 in which P=8. FIG. 11 illustrates the data dimensionality, FIG. 12 illustrates the resultant input data values that will be stored in memory, and FIG. 13 illustrates a number of different approaches for writing data to the input data buffer for different values of NPW. FIG. 13(a) illustrates an arrangement where the data has been read from external memory and into the input data buffer where NPW=8. As such all planes of data are read for each location during a first write cycle and thus only input data values for p=0 are read from external memory and loaded into the input data buffer, i.e. values (0,0,0) to (7,0,0). The shaded locations in FIG. 13(a) illustrate the input data values that are written to the input data buffer in the first write cycle. As can be seen from FIG. 13(a), eight different values are written to the input data buffer during the first write cycle and no bank collisions occur during the first write cycle.

Figure 13C:
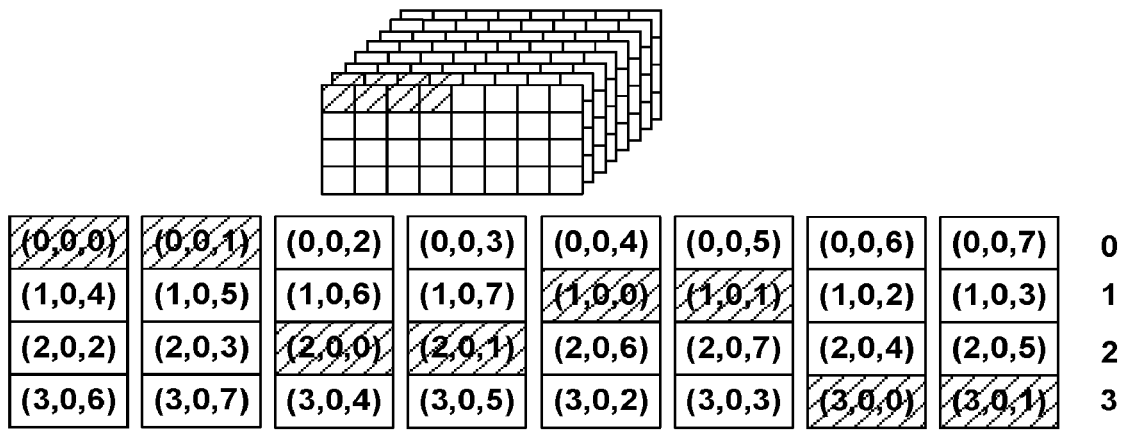
Figure 13D:
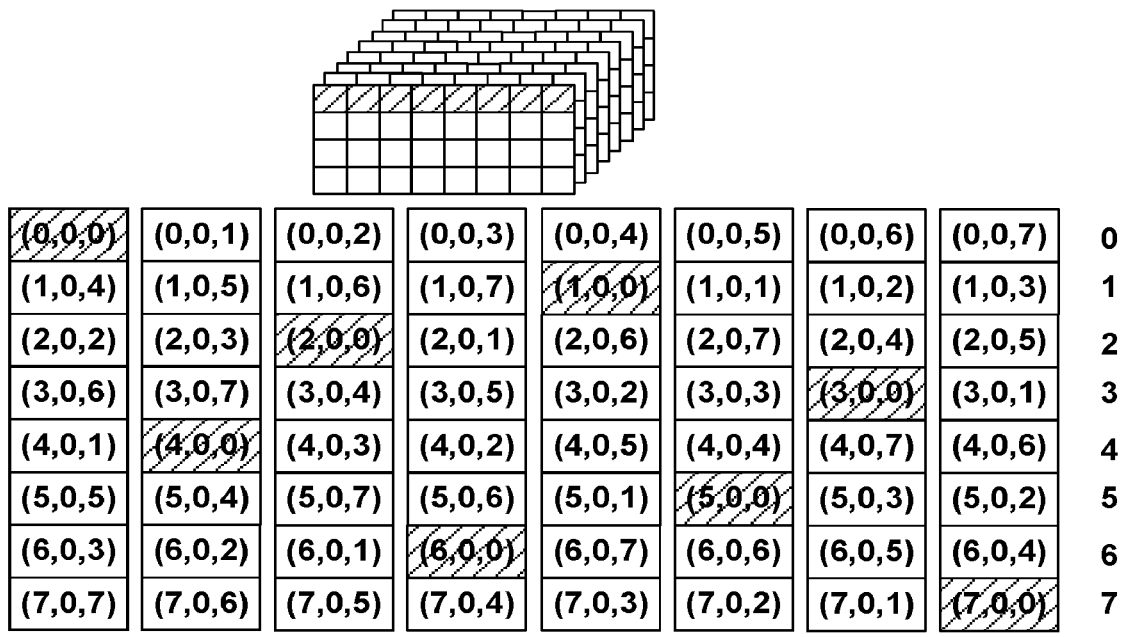

FIG. 13(b) illustrates an alternative arrangement where the data has been read from memory into the input data buffer where NPW=4. In this arrangement, the first four planes from each (x,y) coordinate are read in order. Accordingly, for each x, y coordinate, coordinates (x, y, 0), (x, y, 1), (x, y, 2), and (x, y, 3) are written first. Put another way, the first four plane indices at each (x,y) location are written first. As can be seen from FIG. 13(b), eight values are written to the input buffer during a single write cycle (with each written input data value shaded) without the occurrence of a bank collision. FIG. 13(c) illustrates a further arrangement where NPW=2 and FIG. 13(d) illustrates another arrangement where NPW=1. In the arrangement of FIG. 13(c), two input data values from consecutive x, y coordinates are written, namely the first two plane indices, in a single write cycle. In the arrangement of FIG. 13(d), a single input data value, namely the first plane index, is read from the input data buffer at consecutive x, y coordinates. As can be seen from FIGS. 13(c) and 13(d), the number of MEMADDR locations from which input data values are written to in a single write cycle increases as NPW decreases. For all of the examples of FIG. 13, it can be seen that despite the input data being received in a different order to the first implementation, bank collisions are avoided.

In these arrangements, it can be seen that the addressing scheme of the second implementation stores the input data in the input data buffer in a manner that avoids collisions regardless of the different possible schemes for writing data to the input data buffer (based on the value of NPW). In these arrangements, NPW may be a power of two greater than or equal to NPU, where NPU is the largest power of two dividing P, up to a maximum of $N_B$.

Addressing Scheme—Third Implementation

The first and second implementations described above have particular application in layers of a CNN where the vertical stride t is set to 1. In some implementations, for example in some layers, it may be that the vertical stride t is greater than one. Where t=1, the filter is applied along a particular row of input data and the vertical position of the filter is incremented by 1, thereby resulting in a filter overlap of n−1 rows. The filter is then passed along a row input data before the vertical position of the filter is again incremented by 1. In contrast, where t>1 the vertical position of the filter is incremented by t and the filter overlap is n−t.

Figures 14A, 14B, 14C, 14D:
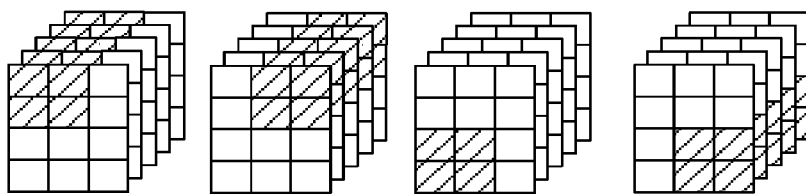
FIG. 14A to FIG. 14D show a plurality of stages of a filter traversing input data according to a third implementation.
Figure 16D:
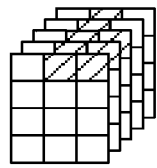
FIG. 16A to FIG. 16I show a plurality of cycles of reading data from the input data buffer according to the third implementation.
Figure 16E:
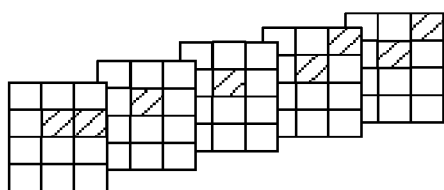
Figure 16F:
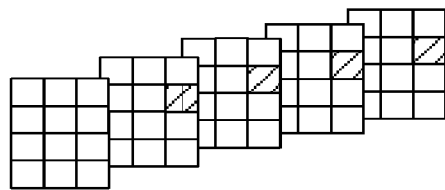
Figure 16G:
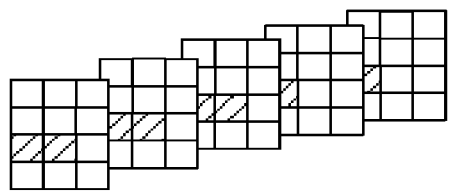
Figure 16H:
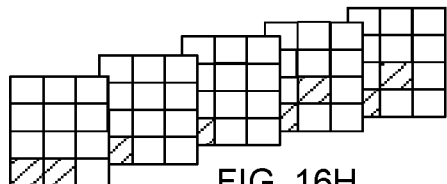
Figure 16I:
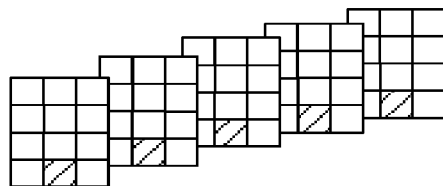
Figure 16J:
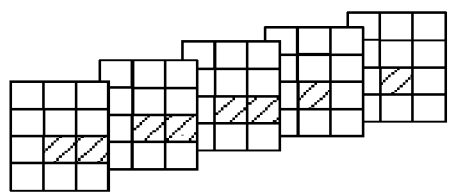
Figure 16K:
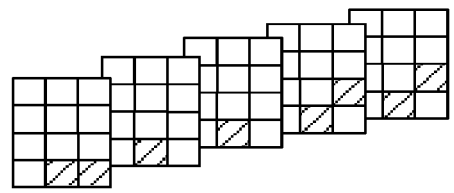

An example of a filter traversing the input data with a vertical stride of 2 is illustrated in FIGS. 14 to 16, such that P=5, m=2, x=3, and t=2. In FIGS. 14(a) and 14(b), a first pass along a row of the input data is performed by the filter. In FIG. 14(c), the filter has completed a pass along a row of the input data and the filter returns to the start of a row to perform a subsequent pass. However, unlike the previously described arrangements, the filter does not increment in vertical position by 1. Instead, the vertical position of the filter increments by 2. In FIG. 14(d), the second pass of the filter is completed. This change in the vertical stride can be regarded to change the number of rows that are effectively "consumed" during a pass along a row of the input data. For example, after the completion of the first pass in the arrangement of FIG. 6 the first row of data is no longer needed for subsequent passes. This can be seen in FIGS. 6(c) and (d), where the first row of input data is not used. Accordingly, the first row of data is considered "consumed" and thus can be replaced with other input data for later use. In contrast, after the first pass of the filter in FIG. 14, two rows are "consumed". This can be seen in FIGS. 14(c) and (d) where the top two rows are no longer used and thus can be replaced.

A third implementation of an addressing scheme modifies the addressing scheme to account for a filter stride that is greater than 1. The third implementation implements an addressing scheme according to the following equations:

$$MEMADDR_{unwr}(x, y, p) = \frac{x*P + p + y*WordsPerLine}{N_B}$$

$$MEMADDR(x, y, p) = \left(MEMADDR_{unwr}\left(x, \frac{y - y_0}{t}, p\right)*t + (y - y_0)\% \ t\right)\% \ MEMSIZE$$

$$BANKSEL(x, y, p) = (x*P + p + y*m*P)\% \ N_B$$

Where t represents the vertical stride of the filter and $y_0$ represents the vertical position of the first row of the filter that is to be processed, where that first row of the filter is not the first row of the input data. $y_0$ therefore represents an offset in the position of the filter based on the stride to be applied. As can be seen from the above equations, the calculation of the BANKSEL value for each input data value is the same as the corresponding BANKSEL calculation for the first implementation set out above. The difference in the MEMADDR calculation between the first and third implementations is that the MEMADDR calculation may be separated into two different calculations. The first calculation determines the $MEMADDR_{unwr}$ value which is an unwrapped version of the MEMADDR value that is not wrapped to MEMSIZE using a modulo calculation. The MEMADDR calculation is performed using modified x, y, and p coordinates for a particular input data value. In particular, the y coordinate is modified based upon the $y_0$ offset value.

The result of storing input data values in the input data buffer using this approach is that, when compared with the first implementation, the MEMADDR rows in the input data buffer at which the data is stored using this approach are interleaved relative to the first implementation. This addressing scheme has particular application in circumstances where the size of the input buffer is only just large enough to handle input data for a particular layer of the CNN. In some circumstances, for efficient processing the input buffer may need to hold at least n+t−1 lines of data. This is because in the previously described implementations, when processing a row of the input data space, only a single line of data is "consumed" (i.e. a single line of data is no longer required and may be overwritten). If the input data buffer were to hold n lines of data, then for t>1, if a row of data is completed, the buffer must wait for t−1 lines of data to be fetched from memory before continuing processing, which may result in a gap in processing.

The input data buffer is designed to receive a stream of data and generate a stream of data, with the MEMADDR locations wrapping around the input data buffer memory due to the MEMADDR calculation involving % MEMSIZE. In practice, the range of "unwrapped" addresses that can be held in the input data buffer is artificially limited to MEMSIZE, so that new data that is input into the input data buffer does not overwrite data that is still to be processed in a filter window.

An extreme case is one in which t=n (where n>1). In this case, MEMADDR requires addresses spanning a line, but the adjusted MEMADDR calculation of the third implementation keeps all of the relevant data for an output position in consecutive address. Accordingly, the input data buffer is able to process arbitrarily large image widths keeping the range of addresses bounded.

An example of the third implementation of the addressing scheme is set out in FIGS. 15 and 16. The arrangement of FIG. 15 corresponds to the arrangement of FIG. 5. Specifically, in the both of the arrangements of FIGS. 5 and 15, P=5, m=2, X=3, and $N_B$. The arrangements differ in that in FIG. 5, t=1 and in FIG. 15, t=2 and $y_0$=0. FIG. 15 illustrates the contents of the first eight MEMADDR rows of the input data buffer after the received input data has been stored in the input data buffer according to the addressing scheme of the third arrangement. As can be seen, rows of input data values have been effectively swapped position with respect to the corresponding positions in FIG. 5. Specifically, the input data values at MEMADDR=1 and MEMADDR=2 have effectively swapped position when comparing the data values stored according to the first and third implementations as have input data values at MEMADDR=5 and MEMADDR=6.

FIGS. 16(a) to (l) illustrate a number of read cycles for t=2 according to the third embodiment. As can be seen from these Figures, each read cycle input data values are read from the input data buffer and no bank collisions occur.

In some arrangements, it may be possible to combine the addressing scheme for the second implementation with the addressing scheme for the third implementation so as to perform addressing where a subset of the planes are to be selected and where the vertical stride t>1. In this way, the MEMADDR calculation may be performed according to the third implementation and the BANKSEL calculation may be performed according to the second implementation.

Addressing Scheme—Fourth Implementation

In some arrangements, it may be desirable to retrieve data from the input data buffer in a different order. This is particularly applicable for specific layers of a CNN, such as normalisation and pooling layers. The previous implementations may be used for implementations where the data is read from the input data buffer 200 in an order that is referred to as p->x->y order, since the data is read in an order in which the p coordinate is first incremented for a particular (x,y) position until all of the appropriate values have been read. Then, the x coordinate is incremented and the appropriate p values are read, successively, for each incremented x position until the complete row has been read. Finally, the y coordinate is incremented and the next row is read.

In another implementation, the input data may be read from the input data buffer in a different order referred to herein as "planar column-major" reading format. This reading approach can be regarded as p->y->x order. Having read all of the relevant p values for a particular (x,y) location, the y coordinate is instead incremented and the process is repeated until all of the relevant p values for all y positions for a particular column are read. Then, the x coordinate is incremented to the next column and the process repeats from the top of the following column. Accordingly, where previous approaches refer to the reading of data in a rasterised format, the approach used in this implementation switches the x and y coordinate to read the data in a column-wise manner. An example of the reading order of data is illustrated in FIG. 17.

In this arrangement, a fourth implementation of an addressing scheme may be used. In this fourth implementation, an algorithm may be applied in order to allocate memory locations within the input data buffer to input data values. The following pseudo-code can be used to define the algorithm:

```
if (N2 <= NB)
{
    N'=inverse of (N/N2)modulo(NB/N2)
    Hash(x,y;N)=(x+N'*(y/N2))%(NB/N2)+((x/N2+y)%N2)*(NB/N2)
}
else
{
    Hash(y,N)=y
}
if (P2 <= NB)
{
    P'=inverse of (P/P2)modulo(NB/P2)
    Hash(0,p;P)=(P'*(p/N2))%(NB/P2)+(p%N2)*(NB/P2)
}
else
{
    Hash(0,p;P)=p
}
MEMSEL(x,y,p)=Hash(x + Hash(0,p;P),y,N)%NB
MEMADDR(x,y,p)=((WordsPerLine*y+P*x+p)/NB) % MEMSIZE
```

Where $N_2$ is calculated to be the minimum of $N_B$ and the highest power of two dividing N, where N defines the height of the filter that is applied to the input data and where $P_2$ is calculated to be the minimum of $N_B$ and the highest power of two dividing P. N' is calculated to be the inverse of $$\frac{N}{N_2}$$

modulo $$\frac{N_B}{N_2}.$$

For example the inverse of 3 modulo 16 is 11 because (3*11) modulo 16 is 1.

An example of the fourth implementation defined above is set out in FIGS. 18 to 20, $N_B$=4, P=1, X=5, s=t=1, and m=n=3. FIG. 18 illustrates six different window positions for the filter during the processing of a layer in the fourth implementation. In contrast to previously described arrangements, the data is retrieved in a different order. For example, in FIG. 18(a) the filter is located at the top left hand corner of the data space. Then, the filter is passed down a column until the data in that column has been read, as can be seen in FIG. 18(c). Then, the filter position is incremented horizontally according to a horizontal stride, s, as shown in FIG. 18(d). FIG. 19 illustrates locations in the input data buffer where the data values are stored using the addressing scheme of the fourth implementation set out above. As can be seen in FIG. 19, four banks of memory are provided each represented by a column with the leftmost column Bank 0 and the rightmost column Bank 3. MEMADDR values are shown to the right of FIG. 19. Portions of memory in which no data values are stored, i.e. padding locations, are referenced by the term "PAD".

Figure 20A:
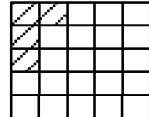
FIG. 20A to FIG. 20I show a plurality of cycles of reading data from the input data buffer according to the fourth implementation.
Figure 20B:
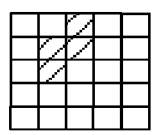
Figure 20C:
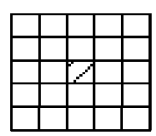
Figure 20D:
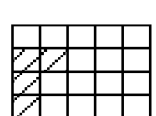
Figure 20E:
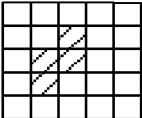
Figure 20F:
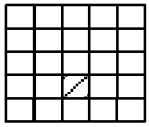
Figure 20G:
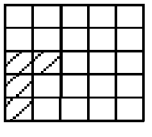
Figure 20H:
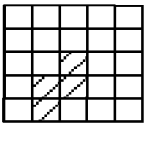
Figure 20I:
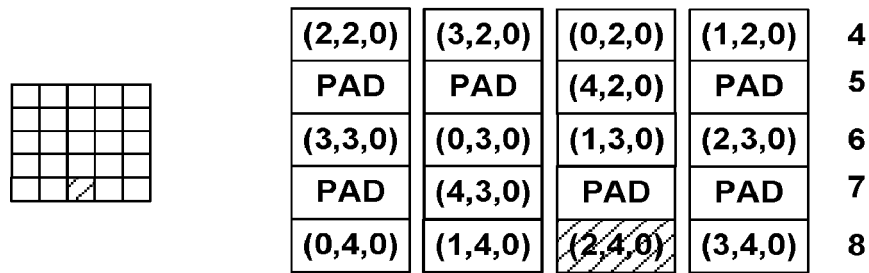

FIGS. 20(a) to 20(i) each illustrate a separate read cycle used in reading data that together allow the data from window locations of FIGS. 18(a) to (c) to be read. FIG. 20(a) illustrates a first read cycle in which a portion of the data required from the window position of FIG. 18(a) is read. FIG. 20(b) illustrates a second read cycle to read a second portion of the data required in FIG. 18(a). In FIG. 20(c), the final portion of data for reading the data required in FIG. 18(a) is performed. Similar read cycles (in this example three per filter position in the data space) for the filter position illustrated in FIG. 18(b) (see FIGS. 20(d) to 20(f)) and for the filter position illustrated in FIG. 18(c) (see FIGS. 20(g) to Figures (i)).

As can be seen from the fourth implementation of FIGS. 18 to 20, the data is read in a column-wise order. In this arrangement, the data is positioned across the memory banks in a manner that is conscious of the data and filter format. As such, the data can be read from across the banks with no (or in other implementations minimal) bank collisions. In this way, data throughput from the input data buffer to the convolution engines is both fast and consistent. It will be appreciated that the degree of padding (and therefore the efficiency in the use of the capacity of the input data buffer) depends on the specific dimensions of the input data buffer and filters. Some formats may utilise less padding than others.

Cursor

The implementation of the above-described arrangements can be simplified by eliminating some of the arithmetic required. Specifically, it is possible to eliminate the arithmetic apart from the implementation of additions and subtractions by variables derived from the layer parameters, i.e. the filter and data format information. In some arrangements, format values may be passed from an external source to the hardware accelerator (for example via a driver that supplies values). For example, (s*P) and (t*WordsPerLine) may be provided as pre-computed values (along with or instead of specific format parameters). In some arrangements, these values may be computed by the hardware accelerator since calculations such as multiplications can be performed relatively efficiently.

It is possible to eliminate the arithmetic by keep a "cursor" value to salient positions, such as:
- the (0,0,0) filter value for the start of the current output row and column;
- the (0, y, 0) filter value for the start of the current output row and column;
- the (x, y, 0) filter value for the start of the current output row and column; and
- the (x,y,p) filter value for the start of the current output row and column.

where x<X, y<Y, and p<P. When one of these cursor values need to be updated, it can be derived by a small change to itself or a previous cursor value. In one implementation, a cursor can be considered as a two-value array in the following form:

$$Cursor(x,y,p)=(RasterAddr(x,y,p), RAMSEL(x,y,p))$$

Where $$RasterAddr(x,y,p)=(x*P+p+y*WordsPerLine) \% (RAMSIZE*N_B)$$

Such that $MEMADDR(x, y, p) = \frac{RasterAddr(x, y, p)}{N_B}$.

For any layer parameters, $\Delta x$, $\Delta y$, and $\Delta p$ (e.g. where $\Delta x$ is the change in x, $\Delta t=0$, and $\Delta p=0$). In some arrangements, the values of Cursor(x+$\Delta x$, y+$\Delta y$, p+$\Delta p$) can be computed efficiently by the following pseudo-code for the first implementation described previously:

RasterAddr'=RasterAddr(x,y,p)+$\Delta x$*P+$\Delta p$+ $\Delta y$*WordsPerLine if
    RasterAddr'<MEMSIZE*$N_B$ RasterAddr(x+$\Delta x$,y+$\Delta y$,p+$\Delta p$)=RasterAddr' else

RasterAddr(x+$\Delta x$,y+$\Delta y$,p+$\Delta p$)=RasterAddr'- MEMSIZE*$N_B$ endif RAMSEL(x+$\Delta x$,y+$\Delta y$,p+$\Delta p$)=(RAMSEL(x,y,p)+ $\Delta y$*M*P+$\Delta x$*P+$\Delta p$)%$N_B$.

Similar cursor calculations can be made for other implementations.

The addressing schemes described herein are for use with an input data buffer that is configured for use in a hardware implementation of a CNN. The input data buffer is configured to retain or hold input data, for example in a volatile memory. In this way, the input data buffer 200 differs from memory 600 in that it may be internal to the CNN hardware implementation and may temporarily store the input data values for the values to be provided to the convolution engines. The input data buffer reduces the need to read data multiple times from memory, such as external memory. In this way, an improved input data buffer addressing scheme also improves the memory bandwidth of the system.

In some arrangements, the hardware logic (e.g. the hardware accelerator) may be configured to implement a CNN. In some arrangements, the hardware logic may be configured to implement any CNN. For example, the hardware logic may be configured to receive data defining filters of a CNN to be implemented and the format of data to be processed at each layer, so as to process input data according to the filters. In hardware logic configured to implement a CNN, the data output from the convolution engines 310 may be passed (directly or indirectly) to either the input data buffer or to the memory 600. In this way, the data output from the convolution engines in a first layer may be passed back (cycled) through the convolution engines 310 and processed in a second layer. As mentioned previously, the data output from the first layer may form the input data to a subsequent layer and the dimensions of the input data and the filters for a first layer may differ from the dimensions for the next, second layer.

Accordingly, the input data buffer 200 may be provided with a control stream comprising control stream data for each layer that is to be processed. The control stream data may be received from an external data source upon configuration of the hardware accelerator or prior to processing input data in the CNN. The control stream data may comprise data indicating at least one format parameter of the input data. The control stream data may additionally or alternatively comprise data indicating at least one format parameter of the filter data. For example, each format parameter may indicate one or more dimensions of the input data or filter data used to process that layer. For example, the format parameter may indicate one or more of filter width m, filter height n, data width X, data height Y, number of planes P, number of filters F, vertical filter stride t, and/or horizontal filter stride s. The control stream may comprise at least one format parameter for each layer. In some arrangements, at least one format parameter may differ between layers and thus should be determined by a controller before the layer is processed.

In some implementations, instead of receiving the data as part of a control stream, the format parameters may be provided using other mechanisms. For example, the format parameters may be stored in memory and retrieved as and when a layer is processed.

In some arrangements, the banked memory of the input data buffer 200 may be a volatile memory configured to enable data to be retrieved in a single read cycle from each bank of memory. For example, in some arrangements, the banked memory may take the form of banked RAM memory. In other arrangements, the input data buffer may be formed of other types of volatile memory. As described below, the input data could be formed of banked non-volatile memory.

The addressing schemes provided herein are applicable for use in an input data buffer addressing scheme within a CNN hardware accelerator. The examples set out in this application have particular application in CNNs due to the geometry of the input data space, and the geometry of the filters and the sequence in which the two sets of values are convolved. Since the addressing scheme is able to make use of data relating to the dimensions of the input data and/or the filter data, the addressing scheme is able to improve throughput. For CNNs, a known set of parameters are used to define the dimensions of the input data and the filter data. In this way, the relative geometric size and shape of the input data and the filter data, as well as the manner in which the two are applied to one another, enables an addressing scheme that provides high throughput to be achieved. The skilled person will appreciate that the concepts set out herein can be applied in other technical fields where there is a geometrical relationship between data and the order in which it should be retrieved from a buffer.

For example, in other applications, the addressing scheme may take into account one or more dimensions of the data that is to be stored in the buffer and/or information relating to the dimensions of other data to which the stored data is to be applied. For example, the addressing schemes may also be applicable to the sharding of data for a geographic information system that utilises banked non-volatile memory.

In some implementations, the hardware logic 100 (e.g. the hardware accelerator) may comprise control logic or a control module (not shown) that is configured to manage the addressing scheme used by the input data buffer 200. For example, the control logic may be configured to receive at least one format parameter for the input data and at least one format parameter for the filter data of the layer being processed and to perform, based on the format parameters, the addressing calculations. The control logic may also be configured to control the input data buffer 200 to place the input data into the input data buffer in accordance with the calculation address locations. The control logic may further be configured to receive subsequent format data for at least one of the input and the filter data and to use this format data in a subsequent layer so as to process that subsequent layer.

Figure 22:
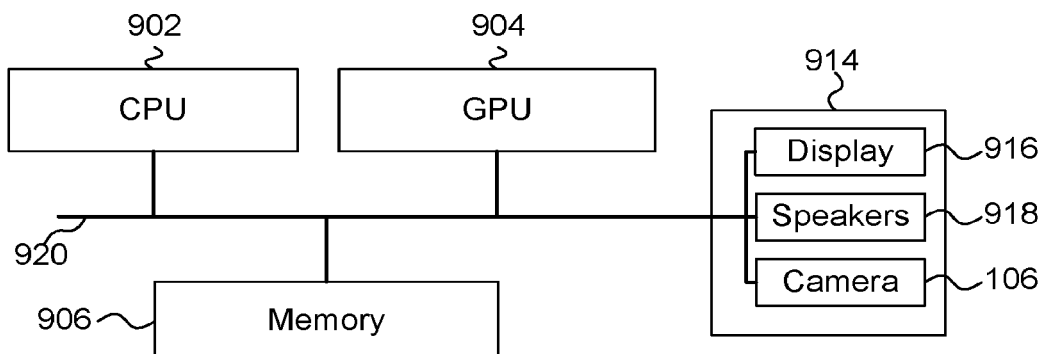
FIG. 22 shows a computer system in which a convolutional neural network hardware accelerator is implemented.

FIG. 22 shows a computer system in which the convolutional neural network hardware accelerators described herein may be implemented. The computer system comprises a CPU 902, a GPU 904, a memory 906 and other devices 914, such as a display 916, speakers 918 and a camera 106. A processing block 910 is implemented on the GPU 904. In other examples, the processing block 910 may be implemented on the CPU 902. The components of the computer system can communicate with each other via a communications bus 920. A store 912 is implemented as part of the memory 906.

The convolutional neural network hardware accelerator of FIG. 22 is shown as comprising a number of functional blocks. This is schematic only and is not intended to define a strict division between different logic elements of such entities. Each functional block may be provided in any suitable manner. It is to be understood that intermediate values described herein as being formed by a convolutional neural network need not be physically generated by the convolutional neural network at any point and may merely represent logical values which conveniently describe the processing performed by the convolutional neural network between its input and output.

The convolutional neural network hardware accelerators described herein may be embodied in hardware on an integrated circuit. The convolutional neural network hardware accelerators described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed in an integrated circuit manufacturing system configures the system to manufacture a convolutional neural network hardware accelerator configured to perform any of the methods described herein, or to manufacture a convolutional neural network hardware accelerator comprising any apparatus described herein. An integrated circuit definition dataset may be, for example, an integrated circuit description.

Therefore, there may be provided a method of manufacturing, at an integrated circuit manufacturing system, a convolutional neural network hardware accelerator as described herein. Furthermore, there may be provided an integrated circuit definition dataset that, when processed in an integrated circuit manufacturing system, causes the method of manufacturing a convolutional neural network hardware accelerator to be performed.

An integrated circuit definition dataset may be in the form of computer code, for example as a netlist, code for configuring a programmable chip, as a hardware description language defining an integrated circuit at any level, including as register transfer level (RTL) code, as high-level circuit representations such as Verilog or VHDL, and as low-level circuit representations such as OASIS® and GDSII. Higher level representations which logically define an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a convolutional neural network hardware accelerator will now be described with respect to FIG. 23.

Figure 23:
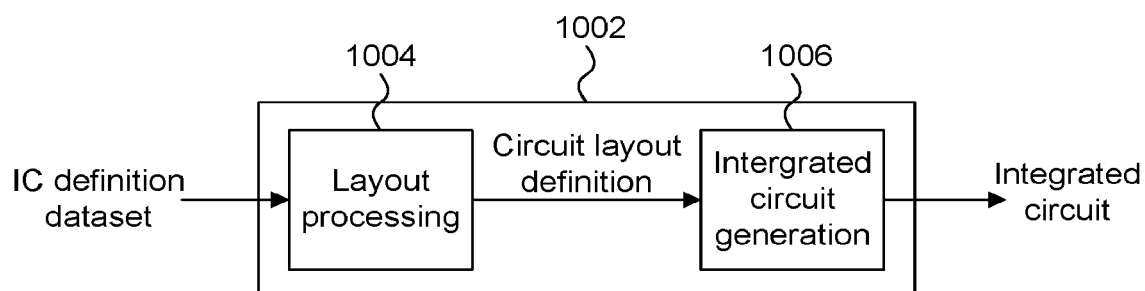
FIG. 23 shows an integrated circuit manufacturing system for generating an integrated circuit embodying a convolutional neural network hardware accelerator.

FIG. 23 shows an example of an integrated circuit (IC) manufacturing system 1002 which comprises a layout processing system 1004 and an integrated circuit generation system 1006. The IC manufacturing system 1002 is configured to receive an IC definition dataset (e.g. defining a convolutional neural network hardware accelerator as described in any of the examples herein), process the IC definition dataset, and generate an IC according to the IC definition dataset (e.g. which embodies a convolutional neural network hardware accelerator as described in any of the examples herein). The processing of the IC definition dataset configures the IC manufacturing system 1002 to manufacture an integrated circuit embodying a convolutional neural network hardware accelerator as described in any of the examples herein.

The layout processing system 1004 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1004 has determined the circuit layout it may output a circuit layout definition to the IC generation system 1006. A circuit layout definition may be, for example, a circuit layout description.

The IC generation system 1006 generates an IC according to the circuit layout definition, as is known in the art. For example, the IC generation system 1006 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1006 may be in the form of computer-readable code which the IC generation system 1006 can use to form a suitable mask for use in generating an IC.

The different processes performed by the IC manufacturing system 1002 may be implemented all in one location, e.g. by one party. Alternatively, the IC manufacturing system 1002 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a convolutional neural network hardware accelerator without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 23 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 23, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

The invention claimed is:

1. A method for receiving input data for a layer of a convolutional neural network (CNN) for processing, the method comprising:
   receiving input data comprising input data values to be processed in a layer of the CNN;
   determining addresses in banked memory of a buffer in which the received data values are to be stored based upon format data indicating a format parameter of the input data in the layer and indicating a format parameter of a filter which is to be used to process the input data in the layer; and
   storing the received input data values at the determined addresses in the buffer for retrieval for processing in the layer.

2. The method according to claim 1, wherein an address at which an input data value is to be stored is defined by a bank number indicating the bank of the buffer in which the input data value is to be stored and an address number indicating the position within the bank at which the input data value is to be stored.

3. The method according to claim 1, wherein the buffer comprises $N_B$ banks and wherein determining an address in the banked memory of the buffer in which the received data values are to be stored is further based on the number $N_B$ banks.

4. The method according to claim 1, wherein the input data is formatted into multiple two-dimensional planes forming an input data space and wherein determining an address in the banked memory of the buffer in which the received data values are to be stored is further based on the coordinates of the input data within the input data space.

5. The method according to claim 4, wherein the format parameter of the input data comprises data indicating the total number of planes P in the input data for the layer and wherein determining an address in the buffer for an input data value is based upon the number of planes P.

6. The method according to claim 4, wherein an address of an input data value in the buffer is determined based upon a plane index P for that input data value.

7. The method according to claim 1, wherein the input data has a plane width X, wherein the format parameter of the input data comprises the plane width X, and wherein an address of an input data value in the buffer is determined based upon the plane width X.

8. The method according to claim 1, wherein a filter to be applied to the input data in the layer of the CNN has a filter width m, wherein the format parameter of the filter comprises the filter width m, and wherein an address of an input data value in the buffer is determined based upon the filter width m.

9. The method according to claim 1, further comprising, receiving second input data for a subsequent layer of the CNN, comprising:
receiving second input data comprising second input data values to be processed in the subsequent layer of the CNN, wherein the second input data is different to the input data;
determining addresses in banked memory of a buffer in which the received data values are to be stored based upon second format data indicating a format parameter of the second input data in the layer and indicating a format parameter of a second filter which is to be used to process the input data in the subsequent layer; and
storing the second received input data values at the determined addresses in the buffer for retrieval for processing in the subsequent layer.

10. The method according to claim 9, wherein the format of the second input data is different to the format of the input data and wherein the format of the second filter is different to the format of the filter.

11. The method according to claim 1, further comprising receiving the input data from external memory and further comprising receiving the format data from external memory.

12. The method according to claim 1, further comprising reading input data values from the buffer in a plurality of read cycles and passing the read input data values to convolution engines for processing.

13. The method according to claim 12, wherein the buffer comprises $N_B$ banks, and wherein the method further comprises, in a read cycle, reading an input data value from each of the $N_B$ banks of the buffer and, in a subsequent read cycle, reading a further input value from each of the $N_B$ banks of the buffer.

14. The method according to claim 1, wherein the input data values are received in a rasterised order in which the coordinates of the input data values are sequentially incremented first by plane index P, then by horizontal coordinate x, then by vertical coordinate y.

15. Hardware logic for implementing a convolutional neural network (CNN) configured to receive input data for a layer of the CNN, the hardware logic configured to:
receive input data comprising input data values to be processed in a layer of the CNN;
determine addresses in banked memory of a buffer in which the received data values are to be stored based upon format data indicating a format parameter of the input data in the layer and indicating a format parameter of a filter which is to be used to process the input data in the layer; and
store the received input data values at the determined addresses in the buffer for retrieval for processing in the layer.

16. The hardware logic according to claim 15, wherein an address at which an input data value is to be stored is defined by a bank number indicating the bank of the buffer in which the input data value is to be stored and an address number indicating the position within the bank at which the input data value is to be stored.

17. The hardware logic according to claim 15, wherein the buffer comprises $N_B$ banks and wherein determining an address in the banked memory of the buffer in which the received data values are to be stored is further based on the number $N_B$ banks.

18. The hardware logic according to claim 15, wherein the input data is formatted into multiple two-dimensional planes forming an input data space and wherein determining an address in the banked memory of the buffer in which the received data values are to be stored is further based on the coordinates of the input data within the input data space.

19. The hardware logic according to claim 18, wherein the format parameter of the input data comprises data indicating the total number of planes P in the input data for the layer and wherein determining an address in the buffer for an input data value is based upon the number of planes P.

20. A non-transitory computer readable storage medium having stored thereon an integrated circuit definition dataset that, when processed in an integrated circuit manufacturing system, configures the integrated circuit manufacturing system to manufacture hardware logic for implementing a convolutional neural network (CNN) configured to receive input data for a layer of the CNN, the hardware logic configured to:
receive input data comprising input data values to be processed in a layer of the CNN;
determine addresses in banked memory of a buffer in which the received data values are to be stored based upon format data indicating a format parameter of the input data in the layer and indicating a format parameter of a filter which is to be used to process the input data in the layer; and
store the received input data values at the determined addresses in the buffer for retrieval for processing in the layer.

* * * * *